(12) United States Patent
Jacobstein et al.

(10) Patent No.: US 8,249,571 B2
(45) Date of Patent: Aug. 21, 2012

(54) METHOD AND SYSTEM FOR MOBILE CALL CONFERENCING

(75) Inventors: Mark Jacobstein, San Francisco, CA (US); Isaac David Guedalia, Beit Shemesh (IL); Jacob Guedalia, Newtown, MA (US); Sarah Harris, Jerusalem (IL)

(73) Assignee: Qualcomm Iskoot, Inc., San Diego, CA (US)

(*) Notice: Subject to any disclaimer, the term of this patent is extended or adjusted under 35 U.S.C. 154(b) by 96 days.

(21) Appl. No.: 12/658,904

(22) Filed: Feb. 16, 2010

(65) Prior Publication Data
US 2010/0216443 A1     Aug. 26, 2010

Related U.S. Application Data

(60) Provisional application No. 61/153,980, filed on Feb. 20, 2009, provisional application No. 61/336,930, filed on Jan. 28, 2010.

(51) Int. Cl.
*H04M 3/42*     (2006.01)

(52) U.S. Cl. ......... 455/416; 709/203; 709/227; 709/228
(58) Field of Classification Search .................. 455/416; 709/203, 227, 228
See application file for complete search history.

(56) References Cited

U.S. PATENT DOCUMENTS

| | | | |
|---|---|---|---|
| 2007/0112964 A1 | 5/2007 | Guedalia et al. | |
| 2007/0143397 A1 | 6/2007 | Guedalia et al. | |
| 2009/0149167 A1* | 6/2009 | Patel et al. | 455/416 |
| 2010/0208625 A1* | 8/2010 | Logan et al. | 370/260 |

* cited by examiner

*Primary Examiner* — Amancio Gonzalez
(74) *Attorney, Agent, or Firm* — Muncy, Geissler, Olds & Lowe, PLLC

(57) ABSTRACT

A system and method for providing conference calls in a client-server environment is described. In some aspects, conference calling is made possible and efficient for mobile users, including mobile hosts of the conference call who may arrange and set up the conference call easily from a mobile device with the assistance of an application server and/or a call conference server. Also, other mobile users may easily participate in such conference calls from their mobile devices.

10 Claims, 4 Drawing Sheets

METHOD AND SYSTEM FOR MOBILE CALL CONFERENCING

RELATED APPLICATIONS

This application incorporates by reference and claims the priority and benefit, under 35 U.S.C. Sec. 119(e), of each and all of: U.S. Provisional Patent Application 61/153,980, filed on Feb. 20, 2009, entitled "Method for Server-Based Mobile Conferencing," and U.S. Provisional Patent Application 61/336,930, filed on Jan. 28, 2010, entitled "System and Method for Call Conferencing in a Mobile Environment."

TECHNICAL FIELD

The present application relates to wireless communications for mobile devices, and more specifically to establishing teleconferencing among a plurality of parties including parties using mobile phones.

BACKGROUND

Phone conferencing is a tool for connecting a plurality of parties by way of their respective phone connections so that the parties may all participate in a phone conference where the parties may speak and listen to the other parties as if they were together. Present systems allow for notification of phone conference participants of a dial-in phone number and a passcode for joining a phone conference. Phone conferences typically have an organizer or host whose account is used to distribute the invitations to the invitees to the phone conference, and whose account is charged for the cost of such a phone conference.

Present phone conferencing systems are provided by services which rely on electronic mail and browser-based invitation and hosting techniques for setting up the phone conferences. Furthermore, present systems rely on the entry of a passcode, usually a provided numerical code that is punched into a phone's keypad to generate a detectable DTMF sequence to allow access of a participant to the phone conference.

Such systems are difficult or not usable by persons who do not have their home or office computers or land line phones at their disposal, and therefore, it is difficult or impossible for mobile users to easily make arrangements for phone conferences, especially those involving other mobile users.

Existing voice and chat conferencing available today are bulky and inefficient. Typically, an individual who wishes to set up a conference must go to a conferencing application on a personal computer, obtain a dial-in number and passcode, then he or she sends email the conference participants who then dial in at the appointed time with the provisioned dial-in information.

It is therefore useful to have improved and new methods and systems for facilitating the organization, hosting, and establishment and conduct of phone conference sessions involving mobile users and hosted by mobile users.

SUMMARY

Embodiments hereof are directed to systems and methods for providing on-the-go or mobile users with phone conferencing setup capabilities. In some embodiments, the mobile users can organize and initiate a phone conference from their mobile phones, and invitees to the conference can be alerted on their mobile communication devices (e.g., cellular phones, mobile devices) to join one or more such conferences.

Aspects of the present disclosure provide a system and method for creating a method for conferencing involving server-side architecture and functionality that enables fast, efficient set up of conferences via a user's mobile device and an easy-to-use dial-in process for conference invitees using SMS technology.

A client-server architecture is provided to permit mobile users to access and set up conference calls, especially where the participants are listed in a contacts database on a mobile client or on a server serving the mobile client.

In some embodiments, the host can select the desired invitees using keys on the host's mobile device and using a user interface to choose from the contacts available in the host's contacts database. The contacts' information is used to arrange a distribution of invitations of a variety of ways so that the invitees are alerted to the invitation to the phone conference. Then, when the invitees dial in to the conference at the provided phone number for the conference, the server can recognize the individual invitees by their caller identification (caller ID) signals. In some embodiments, this can form a basis for authentication of the calling invitees rather than require a passcode to be entered.

Various embodiments also provide for functions such as conference call switching between more than one ongoing conference. Voice-activated, mobile phone push button and touch screen interfaces, as well as other improvements are described in various embodiments and aspects hereof.

Some embodiments are directed to a system for mobile client-server call conferencing, comprising an application server adapted to receive a call conference request from a mobile host device and adapted for delivering a plurality of text messages to a corresponding plurality of invitee devices, said text messages including respective dial-in and time information for the call conference; a database coupled to said application server for storing a plurality of invitee identifying information corresponding to the plurality of invitee devices or users thereof; and a conferencing server coupled to said database and adapted for establishing a mobile client-server call conference between said mobile host device and a plurality of invitee mobile devices, said invitee mobile devices corresponding to respective entries in said database corresponding to respective invitees.

Other embodiments are directed to a method for providing a call conference in a mobile client-server environment, comprising a mobile call conference host party selecting one or more invitee parties to a conference from a list of contacts on the host's mobile device; providing notification to said invitee parties of the call conference sufficient to inform the invitees as to a time of said call conference and a dial-in number for said call conference; receiving calls from said invitees substantially at the time of said call conference at said dial-in number; verifying an identity of said invitees who call in to the dial-in number against a list of authorized invitees stored in a database at a server; and permitting the authorized invitees to join the call conference.

BRIEF DESCRIPTION OF THE DRAWINGS

For a fuller understanding of the nature and advantages of the present invention, reference is be made to the following detailed description of preferred embodiments and in connection with the accompanying drawings, in which.

DETAILED DESCRIPTION

As discussed above, present phone conferencing technology presents a number of difficulties for mobile users and makes conventional phone conferencing systems and methods unusable or ineffective for these users.

Figure 1:
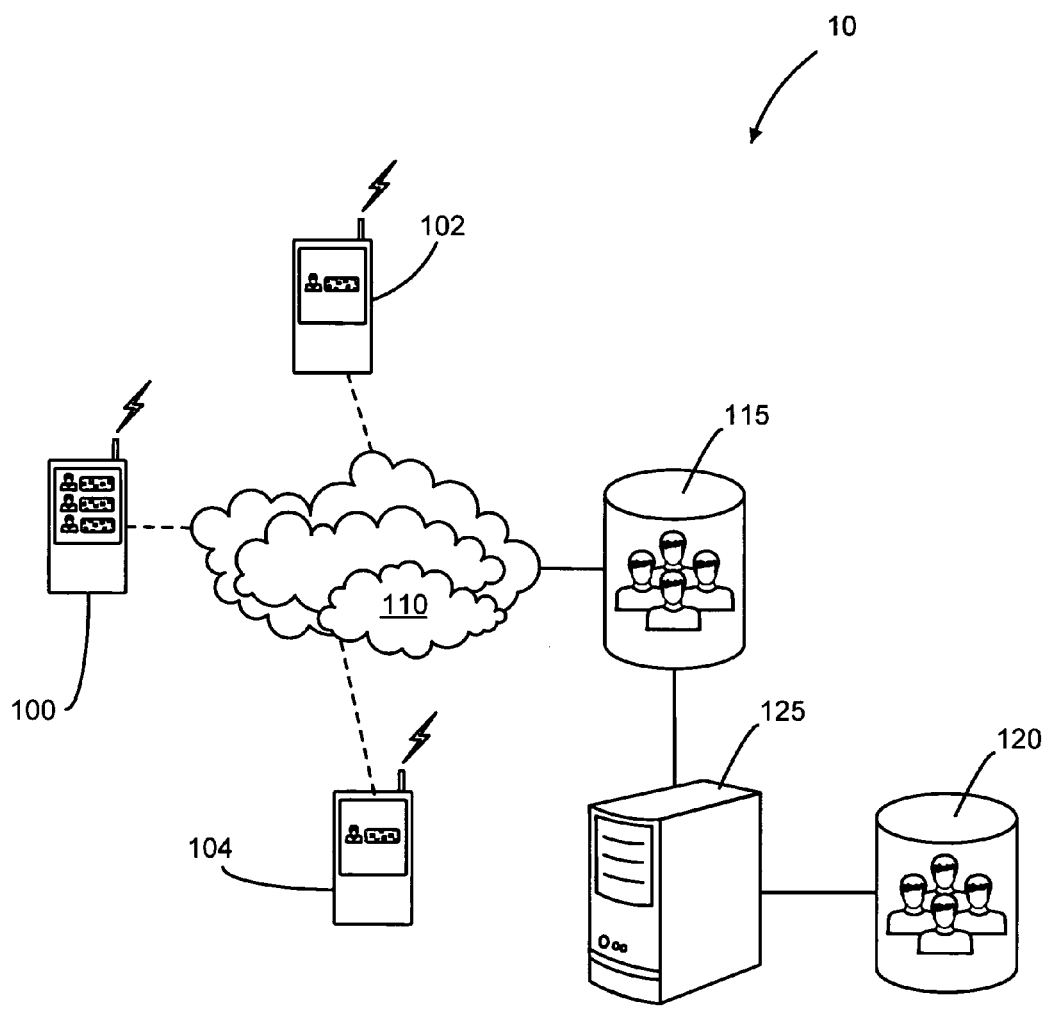
FIG. 1 illustrates an exemplary system for mobile client-server teleconferencing.
Figure 2:
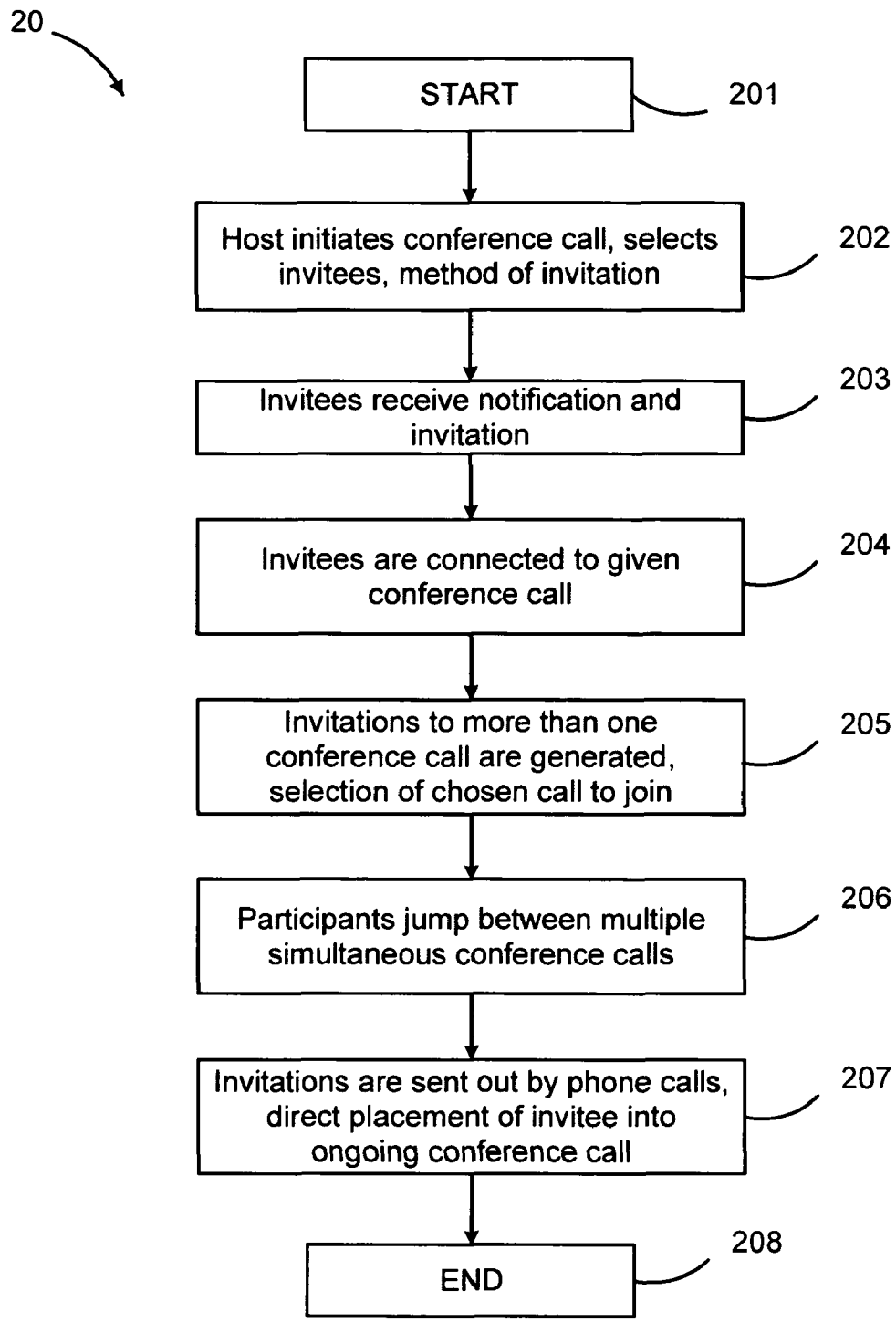
FIG. 2 illustrates an exemplary method for mobile client-server teleconferencing.

Reference is now made to FIG. 1, which is a simplified pictorial illustration of a method for mobile client-server teleconferencing, constructed and operative in accordance with a preferred embodiment of the present invention and to FIG. 2, which is a simplified flowchart illustration of a method for a method for mobile client-server teleconferencing, operative in accordance with a preferred embodiment of the present invention.

A system 10 is provided which is capable of supporting wireless (e.g., cellular or other) communications with a mobile communication device 100 such as a mobile phone. A user on a mobile device 100 wishes to invite two or more contacts, who are using communication devices 102 and 104, which may be mobile devices, to a conference call at a designated time. The user of mobile device 100 runs a conference host setup software application including machine executable and machine readable instructions running on some appropriate processor hardware on mobile device 100.

In some embodiments, the hosting or conference setup application may interface with the user of device 100 through a user interface, and may have instructions and data associated therewith stored on a memory or storage apparatus on device 100. The conference host setup application runs a script that enables its user, the host of the conference call, to specify how he would like to utilize to send invitations to his contacts. A user who is hosting the conference may send invitations through SMS messages, emails, and direct phone calling, and other ways to prepare and announce the conference call.

The host user may also be asked to specify which contacts he would like to invite to the teleconference. These contacts, along with the type of invitation to be issued, are sent to a server 125, which stores the details of the teleconference invitation in a database such that typically, each contact is stored as a separate entry in the table.

Consider an embodiment where Mary (sometimes called host, leader, organizer, or inviter) wants to set up a teleconference with her contacts Joe, Todd, and Lisa, and she wishes to invite them via SMS message. Mary will run the conference setup application on her mobile phone and specify SMS as the invitation means. Then, she will select Joe, Todd, and Lisa from a list of possible invitees or contacts as the participants to invite to this call. The conference setup application resident on the mobile phone then communicates to a database 115 typically over a network such as internet 110. The database table for this teleconference may look something like this:

| Host | Call Time | Invitee Caller ID | DID |
|---|---|---|---|
| Mary | 3:30 | 216-889-7645 (Joe) | 1-653-750-9898 |
| Mary | 3:30 | 647-907-4546 (Todd) | 1-653-750-9898 |
| Mary | 3:30 | 905-489-8738 (Lisa) | 1-653-750-9898 |

When Joe gets an SMS message on his phone about the conference call at 3:30, he receives a phone number to select or click on, depending on Joe's user interface and device operating system, which represents the number for a conferencing server 125. When the conferencing server 125 receives an incoming phone call from Joe, a verification module running on the server notes Joe's incoming caller ID signal such as Joe's mobile phone number. The caller ID can be used by a mapping module, which maps the caller ID to information in database 115, and then Joe is connected to Mary's 3:30 teleconference. The authentication of callers is further explained in pending U.S. patent application Ser. No. 11/435,200 entitled "Caller-Callee Association of a Plurality of Networked Devices," filed on May 15, 2006, as well as U.S. patent application Ser. No. 11/679,518 entitled "Caller-Callee Association of a Plurality of Networked Devices With Direct Dial Through Thin Client," filed on Feb. 27, 2007, and related applications to the present inventors and assignee.

In some embodiments, invitee Joe will not be dialing into the conference call using his mobile phone—and therefore his incoming caller ID will not be available—he may be given a conventional passcode to access the conference call instead.

In other embodiments, a single contact is invited to join more than one teleconference, after the contact's incoming caller ID is verified and mapped with database 115, a list of available teleconferences will be played and the invitee may choose which one to attend.

In yet another embodiment, while invitee Joe is invited to a conference call with host Mary at 3:30, Joe may also be invited to a conference call with another host Sue at 5:15, and with another host Jack at 7:30. When Joe calls in to join a teleconference, he may hear a recorded message such as: "You have three pending teleconferences to choose from. To attend a 3:30 conference with Mary, please press 1. To attend a 5:15 conference with Sue, please press 2. to attend a 7:30 conference with Jack, please press 3."

The default setting can be set in some embodiments on the recorded message to include a phone number to be played instead of an inviter's first name. Therefore, in the default setting of this embodiment, the recorded message Joe would receive would be for example: "You have three pending teleconferences to choose from. To attend a 3:30 conference with 347-897-0098, please press 1. To attend a 514-673-9834, please press 2. To attend a 7:30 conference with 416-785-4421, please press 3."

According to some embodiments, a host may have the option of recording his or her name in the system, which is stored by the server, which would then be played to the invitees instead of the host's or the conference call's phone number.

A contact invited to attend more than one teleconference may also jump between two separate conferences in some embodiments, based on menu options or phone keys that enable this feature. For example, if Joe is concurrently invited to a conference call with Mary's group and Tim's group and, during his talk with Mary's group he would like to ask advice from Tim's group, he may switch over to the conference with Tim and then back to the conference with Mary's group, as he wishes.

Attendees may also be sent live updates, such as "you are now in Conference A and can jump in two minutes to Conference B," and may also be connected to and/or tied into social networks.

If an inviter or conference call host wishes to bypass the SMS messaging system, he or she may instead invite contacts to a teleconference via a direct phone call. The host may choose this option at the conference setup application by selecting "phone" as a method of inviting specified contacts. In this case, the conferencing server 125 may send a message to a SIP server or database 120 with a request to call specified contacts in a message header. SIP server or database 120 would then phone the specified invitees who, upon answering the call, would be immediate participants in a conference call. A message such as: "You are being connected to a conference call" may be played to invitees immediately prior to the call being connected.

In another exemplary embodiment, if Mary is a host who wanted to patch invitee Joe in to a conference call, she may choose to invite him by "phone call". Joe's phone would then ring and when he answered it, he would be part of a conference call without needing to independently connect, dial in, or enter a passcode.

FIG. 2 illustrates an exemplary method 20 for phone conferencing in a mobile client-server environment according to one or more embodiments hereof.

The process begins at step 201 (START). The host initiates the conference setup from his or her conference setup application on the mobile device 100 at step 202, and the user initiating the conference or hosting the same would select the desired invitees from a list of contacts and determine the type of announcement he or she wants sent to the invitees.

At step 203 the invitee receives the invitation and dials in to the conference call as instructed. The server 125 maps the incoming call based on identifying information and the calling invitee can authenticate him or herself using the DTMF tones or the server can authenticate the caller using the incoming caller ID information. The caller is connected to the appropriate conference at step 204.

At step 205, the invitee may be invited to more than one conference call, and the invitee can choose the conference to participate in. The invitee may also jump between simultaneous phone conferences using phone key entry or another user input apparatus at step 206.

Invitations may also be sent by other methods at step 207 by way of the server 125, and a callee may be immediately placed into a conference once the callee answers his or her phone.

The process ends at END step 208.

Figure 3:
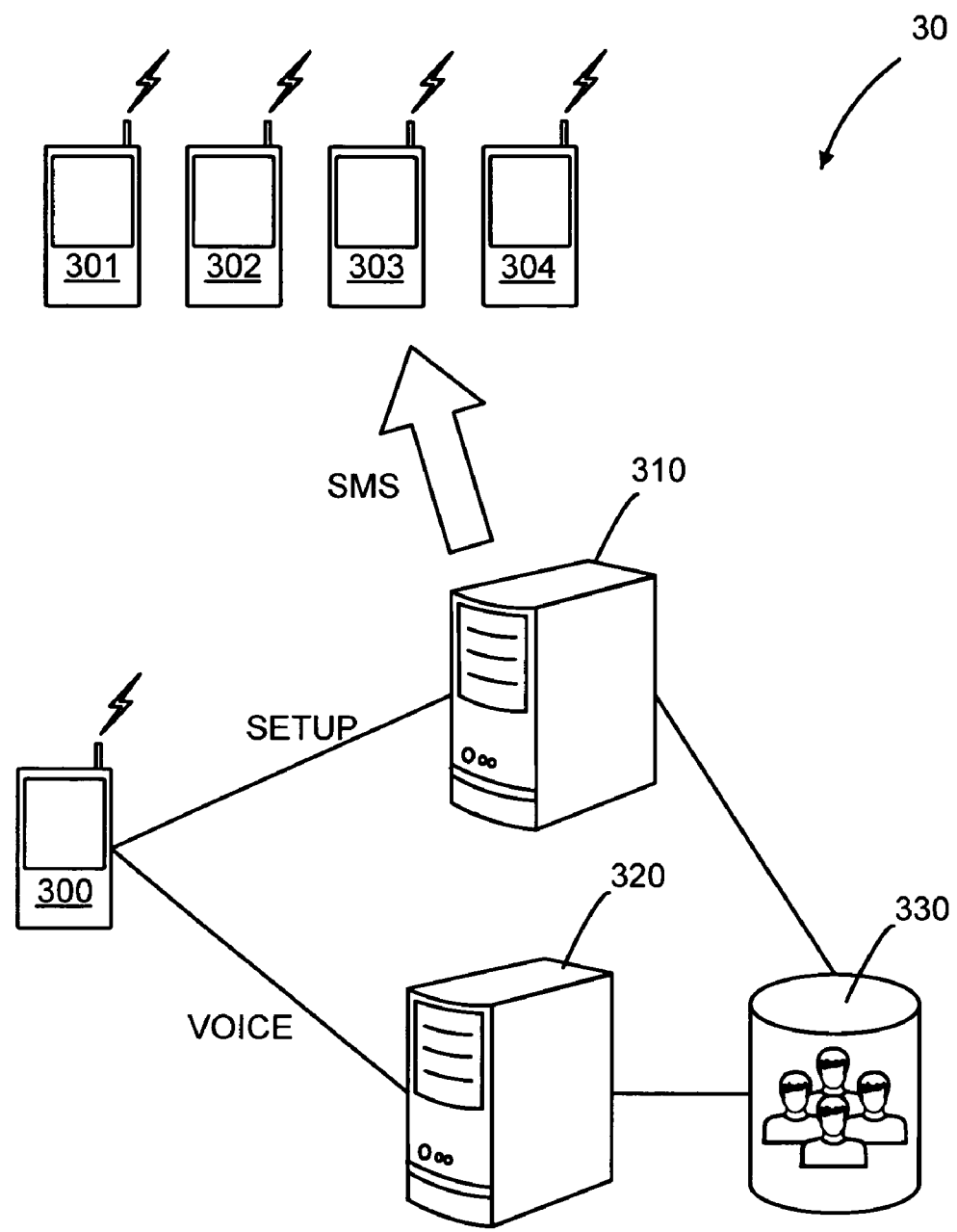
FIG. 3 illustrates another exemplary system for mobile client-server teleconferencing.

Reference is now made to FIG. 3, which illustrates another example of a system 30 for server-enabled mobile conferencing. The system includes an application web server 310 and a conferencing server 320, which in practice may be co-located, remotely located, or implemented on a same machine. The servers are coupled to a database 330, which may be co-located, near, or remotely located over some suitable interface or network.

A user of a mobile device 300 wishes to set up a conference with four of his contacts 301-304. He or she selects the contact's addresses from the contacts list on mobile device 300 and chooses the option for conferencing with these selected contacts using an application running on mobile device 300. Communication between mobile device 300 and application web server 310 can be used for "Setup" purposes, and communications between mobile device 300 and conferencing server 320 may be used for "Voice" purposes. The servers and software provided by iSkoot, Inc. may for example provide one or more of the server functions described herein.

Database 330 may be used by application web server 310 to store participant codes, numbers, IDs, and other contact information.

A request for conferencing is sent to the application server 310. Typically, the user's requested invitees addresses (and their associated phone numbers—MSISDN's) are stored together with user 300's own ID or subscriber or device information. The Application Server may then send SMS messages to the selected contact's MSISDN's inviting them to a conference from their buddy or contact, the user at mobile 300. This SMS message may contain a dial-in phone number for the conference and may also include a PIN, if necessary. The same dial-in number may be sent to all four invitee contacts, alternatively the system may detect that members of the conference are located in different regions, and provide a local dial-up specific for each member. The application server 310 then returns a dial-in number to mobile device 300.

When the four invitees 301-304 click on the provisioned phone number, the conference server 320 checks the provided phone number of the four contacts against a master list and their corresponding inbound dialing number (for example, caller ID and DID to provide a unique identifier). When the conference server 320 verifies that it the assigned dial-in number as was provided to mobile 300, the conference server 320 then opens a conference and adds each caller as the call into the room for all five parties 300-304 to conduct their meeting.

Figure 4:
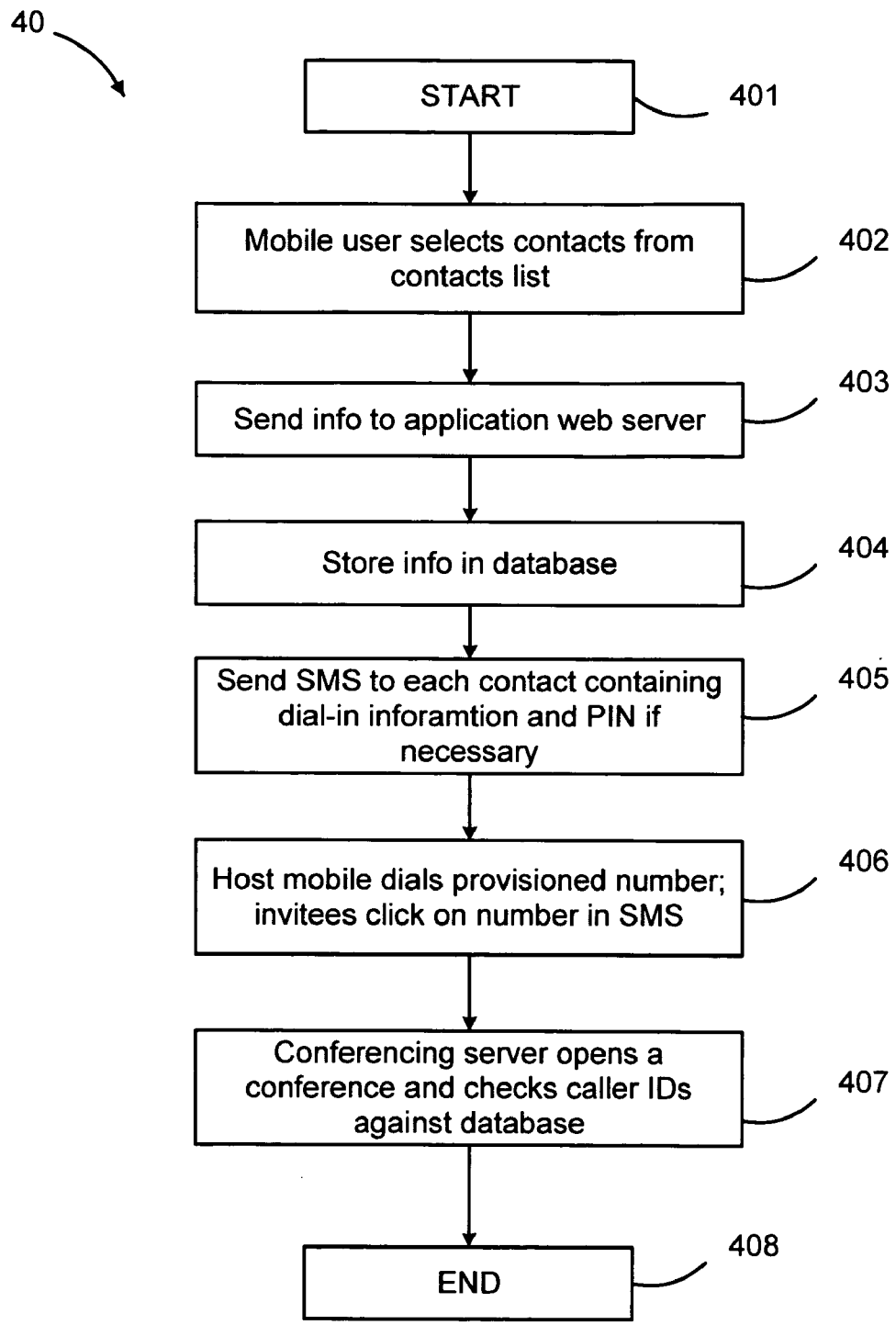
FIG. 4 illustrates another exemplary method for mobile client-server teleconferencing.

FIG. 4 illustrates another method for mobile client-server conferencing 40. The process begins at START step 401.

At step 402 a user on a mobile device (host) selects several contacts from his or her contacts list to invite to a conference.

At step 403 the selections are passed to the application web server, which stores the information needed and contact information in a database at step 404. The application server also sends short message or SMS messages to each invitee. The SMS message may contain information such as dial-in information and PIN or other timing information to permit the invitees to appreciate the details of the set up conference at step 405. The host mobile device also receives such details for the conference.

At step 406 the host or inviting party dials the provisioned phone number for the conference. The invitees click or select the provisioned phone numbers for the conference also.

At step 407 the conferencing server opens up a conference room or implements the conference, and checks that each participant is a verified invitee or host of the conference to allow them to connect to the conference.

The process ends at END step 408.

The present invention should not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A method for providing a call conference in a mobile client-server environment, comprising:
   receiving, from a mobile device operated by a call conference host party, identifiers of one or more invitees to the call conference selected from a list of contacts on the mobile device;
   providing notifications to one or more user devices operated by said one or more invitees sufficient to inform the one or more invitees as to a time of said call conference and a dial-in number for said call conference;
   providing a plurality of call conference invitations to a given one of the one or more user devices;
   receiving calls from the one or more user devices operated by said one or more invitees substantially at the time of said call conference at said dial-in number;

verifying an identity of each of the one or more user devices operated by said one or more invitees against a list of user devices authorized to attend the call conference;

permitting the authorized user devices to join the call conference; and facilitating transfer of the given user device from one call conference to another call conference of the plurality of call conference invitations.

2. The method of claim 1, wherein providing notifications comprises sending a text or SMS message to the one or more user devices.

3. A system for mobile client-server call conferencing, comprising:

an application server adapted to receive a call conference request from a mobile host device and configured to deliver a plurality of text messages to a corresponding plurality of invitee devices, said text messages including respective dial-in and time information for the call conference, said application server further adapted to provide a plurality of call conference invitations to a given one of the plurality of invitee devices;

a database coupled to said application server for storing a plurality of invitee identifying information corresponding to the plurality of invitee devices or users thereof; and a conferencing server coupled to said database and configured to establish a mobile client-server call conference between said mobile host device and a plurality of invitee mobile devices, said plurality of invitee mobile devices corresponding to respective entries in said database corresponding to respective invitees, the conferencing server further configured to verify an identity of each of the plurality of invitee devices against the plurality of invitee identifying information stored in the database, the conferencing server further configured to facilitate transfer of the given on of the plurality of invite devices from one call conference to another call conference of the plurality of call conference invitations.

4. The system of claim 3, wherein said application server and said conferencing server are implemented in different server apparatus.

5. The system of claim 3, wherein said application server and said conferencing server are implemented in a same server apparatus.

6. The method of claim 1, further comprising notifying an invitee operating the given one of the one or more user devices that the plurality of call conference invitations were provided.

7. The method of claim 1, further comprising receiving, from the given one of the one or more user devices, a selection of one of the plurality of call conference invitations to attend.

8. An apparatus for providing a call conference in a mobile client-server environment, comprising:

a mechanism for receiving, from a mobile device operated by a call conference host party, identifiers of one or more invitees to the call conference selected from a list of contacts on the mobile device;

a mechanism for providing notifications to one or more user devices operated by said one or more invitees sufficient to inform the one or more invitees as to a time of said call conference and a dial-in number for said call conference;

a mechanism for providing a plurality of call conference invitations to a given one of the one or more user devices;

a mechanism for receiving calls from the one or more user devices operated by said one or more invitees substantially at the time of said call conference at said dial-in number;

a mechanism for verifying an identity of each of the one or more user devices operated by said one or more invitees against a list of user devices authorized to attend the call conference;

a mechanism for permitting the authorized user devices to join the call conference; and a mechanism for facilitating transfer of the given user device from one call conference to another call conference of the plurality of call conference invitations.

9. An apparatus for providing a call conference in a mobile client-server environment, comprising:

means for receiving, from a mobile device operated by a call conference host party, identifiers of one or more invitees to the call conference selected from a list of contacts on the mobile device;

means for providing notifications to one or more user devices operated by said one or more invitees sufficient to inform the one or more invitees as to a time of said call conference and a dial-in number for said call conference;

means for providing a plurality of call conference invitations to a given one of the one or more user devices;

means for receiving calls from the one or more user devices operated by said one or more invitees substantially at the time of said call conference at said dial-in number;

means for verifying an identity of each of the one or more user devices operated by said one or more invitees against a list of user devices authorized to attend the call conference;

means for permitting the authorized user devices to join the call conference; and means for facilitating transfer of the given user device from one call conference to another call conference of the plurality of call conference invitations.

10. A non-transitory computer-readable medium for providing a call conference in a mobile client-server environment, comprising:

at least one instruction for receiving, from a mobile device operated by a call conference host party, identifiers of one or more invitees to the call conference selected from a list of contacts on the mobile device;

at least one instruction for providing notifications to one or more user devices operated by said one or more invitees sufficient to inform the one or more invitees as to a time of said call conference and a dial-in number for said call conference;

at least one instruction for providing a plurality of call conference invitations to a given one of the one or more user devices;

at least one instruction for receiving calls from the one or more user devices operated by said one or more invitees substantially at the time of said call conference at said dial-in number;

at least one instruction for verifying an identity of each of the one or more user devices operated by said one or more invitees against a list of user devices authorized to attend the call conference;

at least one instruction for permitting the authorized user devices to join the call conference; and means for facilitating transfer of the given user device from one call conference to another call conference of the plurality of call conference invitations.

* * * * *